(12) United States Patent
Wendelrup

(10) Patent No.: US 11,518,328 B2
(45) Date of Patent: Dec. 6, 2022

(54) PROTECTIVE SYSTEM COMPRISING AN AIRBAG SYSTEM WITH AN INFLATABLE HELMET COMMUNICATING WITH AN EXTERNAL DEVICE

(71) Applicant: HÖVDING SVERIGE AB, Malmö (SE)

(72) Inventor: Heino Wendelrup, Bjärred (SE)

(73) Assignee: HÖVDING SVERIGE AB, Malmö (SE)

( * ) Notice: Subject to any disclaimer, the term of this patent is extended or adjusted under 35 U.S.C. 154(b) by 347 days.

(21) Appl. No.: 16/626,929

(22) PCT Filed: Jun. 28, 2018

(86) PCT No.: PCT/SE2018/050703
§ 371 (c)(1),
(2) Date: Dec. 27, 2019

(87) PCT Pub. No.: WO2019/004919
PCT Pub. Date: Jan. 3, 2019

(65) Prior Publication Data
US 2020/0139913 A1    May 7, 2020

(30) Foreign Application Priority Data

Jun. 29, 2017  (SE) .................................. 1750847-4

(51) Int. Cl.
*B60R 21/01* (2006.01)
*A41D 13/018* (2006.01)
(Continued)

(52) U.S. Cl.
CPC ............ *B60R 21/01* (2013.01); *A41D 13/018* (2013.01); *A42B 3/0486* (2013.01); *A42B 3/122* (2013.01);
(Continued)

(58) Field of Classification Search
CPC ... A42B 3/0486; A42B 3/122; B60R 21/0136; B62J 27/20
See application file for complete search history.

(56) References Cited

U.S. PATENT DOCUMENTS

| 6,139,050 | A  | * | 10/2000 | Bultel ................... | A41D 13/018 |
|           |    |   |         |                           | 280/730.1   |
| 2005/0067816 | A1 | * | 3/2005 | Buckman ............. | A61B 5/6852 |
|           |    |   |         |                           | 280/730.1   |

(Continued)

FOREIGN PATENT DOCUMENTS

| CN | 106137210 A1 | 11/2016 | | |
| DE | 102006037731 A1 | * | 2/2008 | ........... A42B 3/0433 |

(Continued)

OTHER PUBLICATIONS

Ge et al., Falling protection system and protection method, Nov. 23, 2016, EPO, CN 106137210 A, Machine Translation of Description (Year: 2016).*

(Continued)

*Primary Examiner* — James A English
(74) *Attorney, Agent, or Firm* — Dilworth IP, LLC

(57) ABSTRACT

A protective system is provided including an airbag system for protecting a body part of a user in case of an accident, including a control unit and a communication interface. The protective system further includes an external device having a communication interface. The communication interface of the airbag system is configured to communicate with the external device using wireless communication.

14 Claims, 6 Drawing Sheets

(51) Int. Cl.
*A42B 3/04* (2006.01)
*A42B 3/12* (2006.01)
*A42B 3/30* (2006.01)
*B60R 21/00* (2006.01)

(52) U.S. Cl.
CPC .......... *A42B 3/30* (2013.01); *A41D 2600/104* (2013.01); *B60R 2021/0088* (2013.01); *B60R 2021/01088* (2013.01); *B60R 2021/01211* (2013.01)

(56) References Cited

U.S. PATENT DOCUMENTS

| | | | |
|---|---|---|---|
| 2008/0030010 A1* | 2/2008 | Millet Lopez | B60R 21/207 280/730.1 |
| 2011/0237194 A1* | 9/2011 | Kojima | B62J 27/20 455/41.3 |
| 2013/0276213 A1* | 10/2013 | Olsson | A42B 3/122 2/468 |
| 2015/0173433 A1* | 6/2015 | Mazzarolo | A41D 13/018 2/463 |
| 2016/0207486 A1 | 7/2016 | Wahl et al. | |

FOREIGN PATENT DOCUMENTS

| | | |
|---|---|---|
| EP | 2313814 B1 | 4/2011 |
| JP | 2002264874 A | 9/2008 |
| KR | 200474020 Y1 * | 8/2014 |
| RU | 110058 U1 | 11/2011 |
| RU | 2435138 C2 | 11/2011 |
| RU | 2015138333 A | 3/2017 |
| RU | 2622867 C1 | 6/2019 |
| WO | 2009112607 A1 | 9/2009 |
| WO | 2012044245 A1 | 4/2012 |

OTHER PUBLICATIONS

Unknown, Helmet safety apparatus, Aug. 18, 2014, EPO, KR 20-0474020 Y1, Machine Translation of Description (Year: 2014).*
Roland Roeder, Monitoring system e.g. for motor vehicle, has central PC module which receives information from several sensors arranged on vehicle and which is connected to storage device, Feb. 14, 2008, EPO, DE 10 2006 037 731 A1, Machine Translation of Description (Year: 2008).*
PCT International Search Report and Written Opinion, Application No. PCT/SE2018/050703, dated Jul. 20, 2018.

* cited by examiner

PROTECTIVE SYSTEM COMPRISING AN AIRBAG SYSTEM WITH AN INFLATABLE HELMET COMMUNICATING WITH AN EXTERNAL DEVICE

TECHNICAL FIELD

The present disclosure relates to a system for protecting a user's head in case of an abnormal movement, such as a fall or a collision. More specifically, the present invention relates to a wearable airbag forming an inflatable helmet for protecting the head of a bicyclist in case of an accident when biking.

BACKGROUND

Airbags for the protection of a person's head are known in the art, for example through WO2012044245. As opposed to vehicular airbags the airbag of WO2012044245 is designed to inflate into a complex head protecting shape. The airbag is designed as a double-bag construction, of which the inflated helmet-shape of the inner plastic bag is formed by the finger like construction of the outer bag.

The airbag mentioned in WO2012044245 is designed to detect if the user is exposed to an abnormal movement, such as a fall or a collision, for a specific activity, for example riding a bicycle. For the airbag to protect the user during an accident, the user has to wear the airbag when doing the specific activity. During the activity the wearable airbag is activated, constantly monitoring the movements of the user. As inflation is controlled by comparing the current movement with reference movements of the particular type of activity, it is important to turn off the wearable airbag once the type of activity is changed, e.g. from cycling to walking or running Compared to traditional helmets the wearable airbag is so gently arranged around the neck that a user may easily forget that he or she is actually wearing it. Hence, deactivation of the wearable airbag may be forgotten. There is thus a need for an airbag that eliminates or at least mitigates problems arising from this situation.

SUMMARY

An object of the present invention is to provide a new type of airbag system which is improved over prior art and which eliminates or at least mitigates the drawbacks discussed above. More specifically, an object of the invention is to provide an airbag system that is configured to communicate with an external device.

In a first aspect, a protective system is provided. The protective system comprises an airbag system in the form of an inflatable helmet for protecting a body part of a user in case of an accident, comprising a control unit and a communication interface. The system further comprises an external device comprising communication means, wherein the communication interface of the airbag system is configured to communicate with said external device using wireless communication.

In one embodiment, the wireless communication is short-range wireless communication. The short-range wireless communication may pertain to any of Bluetooth, WLAN, WiFi, NFC, RF-ID or IrDA. This allows for efficient and cheap communication.

The communication interface of the airbag system may be configured to attempt to communicate with said external device. If the communication between the airbag system and the external device is successful, the control unit of the airbag system may be configured to control the airbag system into a first mode. In the first mode the control unit may be configured to alert the user and/or configured to automatically put the airbag system into an active state and/or to alert the user to manually change to an active state. The communication between the airbag system and the external device will only be successful if they are close to each other, i.e. within the range of the wireless communication. In this way the system can determine if the airbag system is close to the external device.

In one embodiment the communication between the airbag system and the external device is successful when a communication is established between the airbag system and the external device. In another embodiment the communication between the airbag system and the external device is successful when a communication is established between the airbag system and the external device and when the external device and the airbag system are within a predetermined distance from each other.

In one embodiment, if the communication between the airbag system and the external device is not successful, the control unit of the airbag system is configured to automatically put the airbag system in an idle state and/or to alert the user to manually change to an idle state.

In one embodiment, if the communication between the airbag system and the external device is not successful a controller of the external device is configured to control the external device into a safety mode. If the communication between the airbag system and the external device is successful a controller of the external device may be configured to disable a safety mode of the external device. In the safety mode the controller of the external device may be configured to lock the external device so as to prevent the user from using it.

The external device may be an electric bicycle and wherein in the safety mode the controller of the electric bicycle may be configured to lock the electric bicycle so as to prevent the user from using it or to reduce the allowed speed of the electrical bicycle.

In one embodiment the external device is a bicycle.

In an alternative embodiment, the external device is a bicycle lock.

BRIEF DESCRIPTION OF THE DRAWINGS

The present invention will hereinafter be further explained by means of non-limiting examples with reference to the appended schematic figures where.

DETAILED DESCRIPTION

The protective system enclosed herein comprises an airbag system 100 for protecting a body part in case of an abnormal movement of a user and at least one external device 200. The external device 200 may for example be a bicycle or a bicycle lock.

The airbag system 100 is configured to be used to detect an accident, such as a fall or collision, for example when a user is riding a bicycle. The airbag system 100 may thus be configured for the specific use of riding a bicycle. For the airbag system to protect the user during an accident, the user has to wear the airbag system and have it turned on, or activated when performing the specific activity. It would however be preferred to provide a system that determines if the airbag system is needed and in response to that alert the user and/or change the mode of the airbag system and/or change the mode of the external device.

Furthermore, having the airbag system set in an activate state when the user is not doing the intended activity, e.g. not cycling, results in an undesirable energy loss since the airbag system is in an active state using battery power to power a sensor(s) and to process the movement data gathered therefrom, although there is no risk for a fall or collision.

It would thus be beneficial if the computational demanding determination, if a user is about to fall or collide when doing the indented activity, e.g., riding a bicycle, is deactivated when it's not needed so as to reduce the overall energy consumption of the system.

The system herein aims at determining if the airbag system is needed, in particular if a user is actually performing the intended activity or not. This information may for example be used to change the mode of the airbag system 100 and/or the mode of the external device.

The system herein aims at determining if the airbag system 100 is needed or not. This is done by differentiating between situations where the airbag system 100 is within a predetermined distance from the external device 200 and when they are far away from each other. This information may for example be used to change the mode of the airbag system 100 and/or the mode of the external device 200.

Before turning to a detailed description of the disclosed embodiments, an exemplifying environment of the airbag system 100 device will be described with reference to FIGS. 1 to 3, and an exemplifying environment of the external device 200 will be briefly described with reference to FIG. 4.

Airbag System

Figure 1:
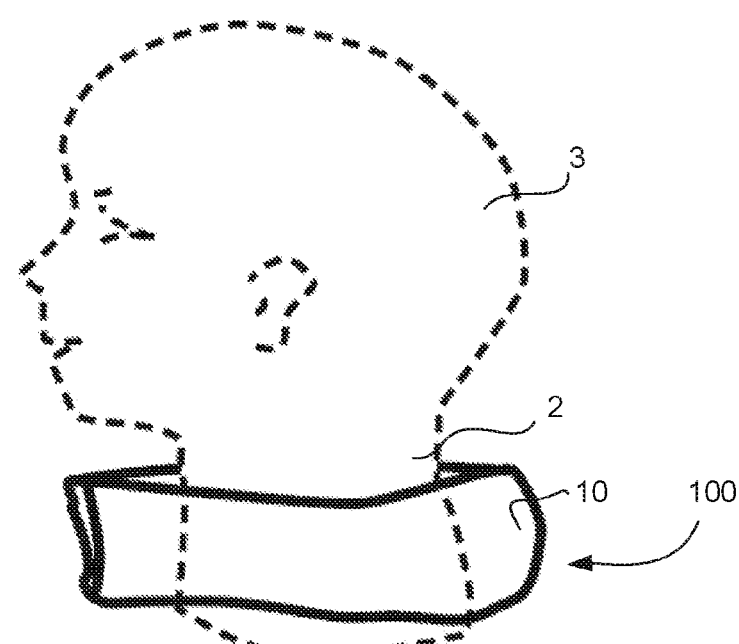
FIG. 1 is a schematic view of a user wearing an inflatable helmet having an airbag system according to some embodiments.

FIG. 1 shows an airbag system 100 according to an embodiment in its non-inflated state. The airbag system 100 comprises an apparel 10 having the shape of a collar which is worn around the neck 2 of a user 3. An idea of the airbag system 100 is to provide a wearable airbag system for protecting a body part in case of an abnormal movement of a user, such as a fall or a collision. The airbag system described herein may for example be used instead of an ordinary rigid helmet, e.g. when bicycling. The airbag system is comfortable to wear, does not affect the user's hair style when worn and does not obstruct vision or hearing when worn in its non-inflated state.

The collar 10 is placed around the neck of the user and has for that purpose a sealable opening 12, normally at the front of the collar. Alternatively, the opening 12 may be arranged at the back of the collar 10 or at the shoulder portion of the collar 10. Furthermore, the opening 12 may be totally or partly dividable.

In one embodiment, the opening 12 is sealed using interlocking means (not shown) to connect the ends of the collar 10 e.g. adjacently the user's 3 throat or neck region. The interlocking means facilitates easy dressing and undressing of the collar 10 on the user 3. Furthermore, the position of the different parts of the interlocking means determines if the airbag system 100 is turned on (i.e. having power) or turned off, and if its turned on in an active state or in an idle state.

In another embodiment the sealing may be arranged as a zipper, buttons, a Velcro fastening, magnets, hooks, hanks, buckles, safety pins, straps or the like. The collar 10 may be made of any kind of flexible material, such as acetate silk, jeans, fleece, cotton, beaver nylon or any other suitable fabric.

When the airbag system is not worn by the user, the collar 10 can be put in a resting position to allow the user to easier carry the collar 10 for example by putting it in a bag. All electronics in the airbag system is turned off when the airbag system is put in the resting position. In the resting position the collar is connected such that the diameter of the collar is greatly reduced. This prevents the user from being able to have to collar 10 arranged around the neck when the collar is in its resting position.

The collar 10 comprises a folded airbag 20 which is inflated to form a helmet for protecting the head of the user 3 in case of an abnormal movement, e.g. during a cycling accident.

Figure 2:
FIG. 2 is a schematic view of a user wearing an inflated helmet having an airbag system according to some embodiments.

An inflated helmet is schematically shown in FIG. 2. Here, the collar 10 is opened to release the airbag 20 previously enclosed therein. The airbag 20 surrounds the neck 2 and the head 4 of the user 3 and provides an efficient protection for the user 3.

The airbag 20 is formed by a flexible material in order to be folded and stored within the collar 10 prior to inflation. The airbag 20 may e.g. comprise an inflatable inner bag surrounded by an outer bag. Inflation of the inner bag leads to expansion of the outer bag and the structure of the outer bag defines the shape of the airbag when the inner bag is inflated. Although not shown in FIGS. 1 and 2, the airbag system may also be a one-bag construction.

The inner bag may be made of a fluid impermeable material, such as thermoplastic polyurethane film. Since fluid cannot easily leave a fluid impermeable bag, a person wearing an airbag 20 according to the invention will be protected by said airbag 20 for some time after expansion of the airbag 20, effectively protecting the head of the user for the entire time of the accident. The inner bag may be flexible and expandable such that it may expand the outer bag upon inflation to a high pressure. Hence, the inner bag may be inflated resulting in a relatively high internal pressure which may be maintained for some time.

An example of how the inner and outer bag may be configured is described in WO2012044245 by the same applicant.

Figure 3:
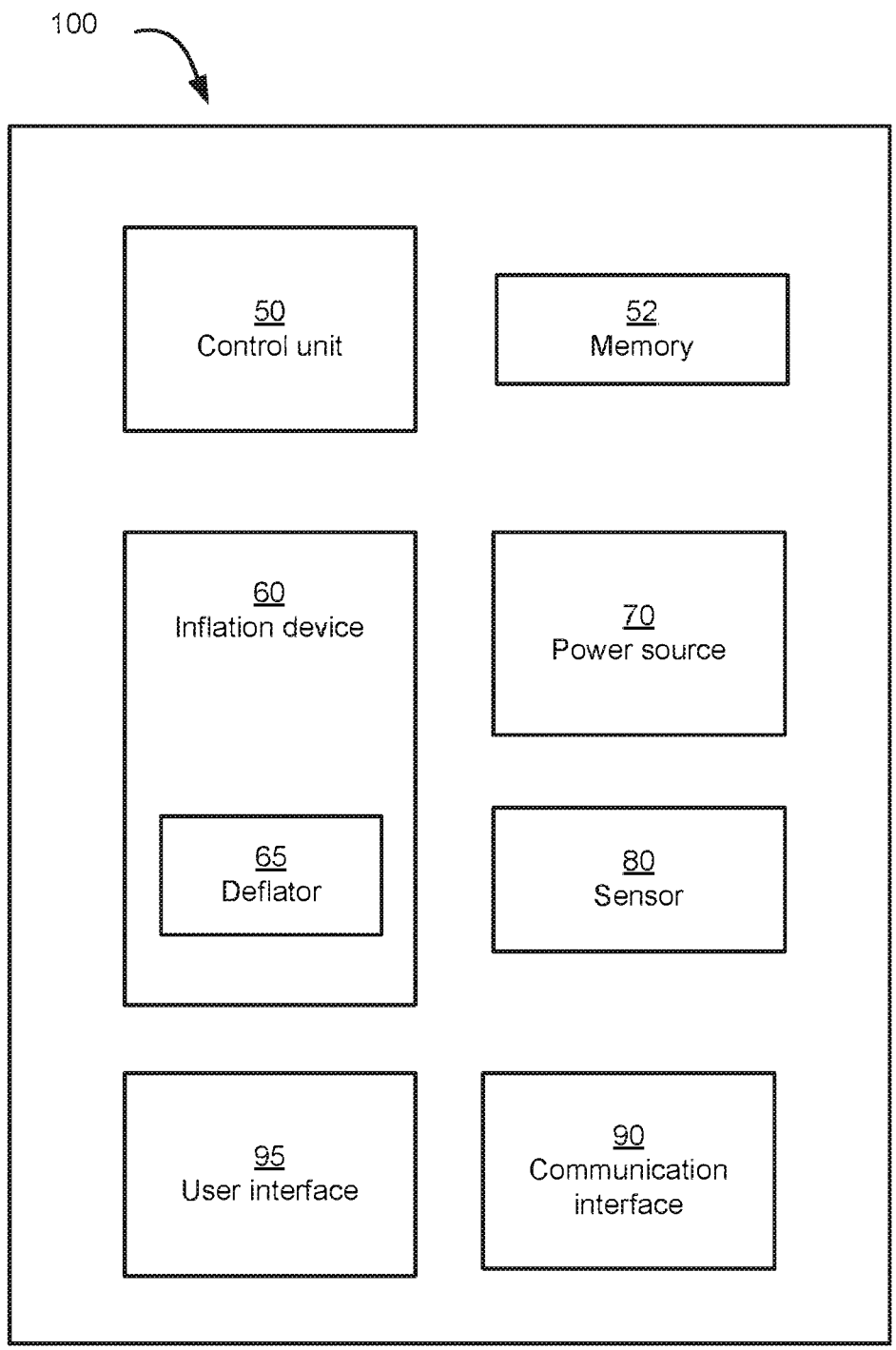
FIG. 3 is a schematic view of an airbag system according to an embodiment.
Figure 4:
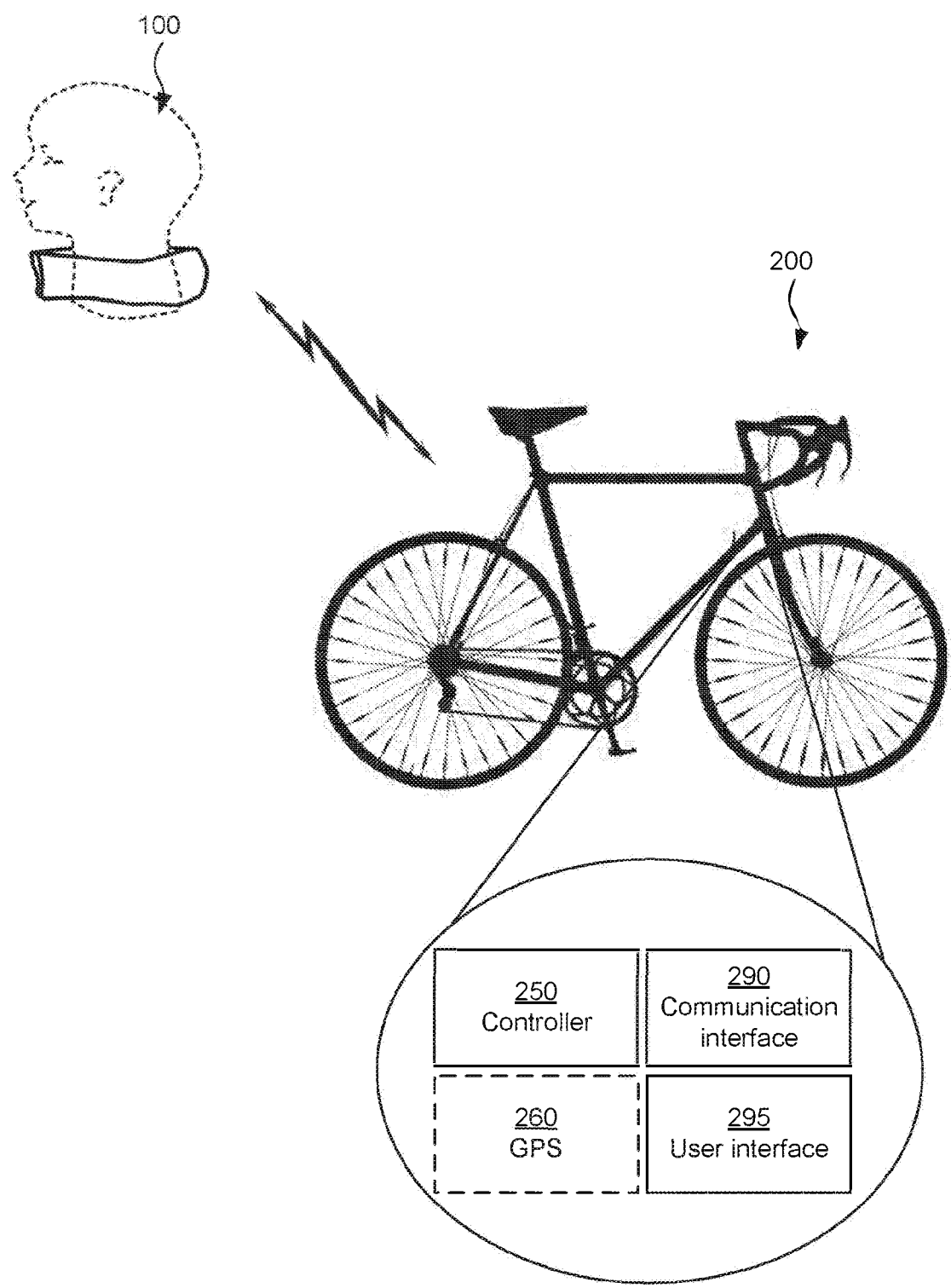
FIG. 4 is a schematic view of an airbag system and an external device according to an embodiment.

As shown in FIG. 3, the airbag system 100 further comprises at least one sensor 80 for detecting movement of the collar 10, i.e. movement of the user 3, and a control unit 50 configured to in response to the information gained by the sensor 80 determine if the movement corresponds to an accident situation. If an accident situation is determined, the control unit 50 trigger inflation of the airbag 20 by means of an inflation device 60. The airbag system 100 further comprises a power source 70, for example a rechargeable battery or a disposable battery, in order to provide electrical power to the parts of the system 100. The different parts will now be described more in detail.

The inflation device 60 may be any suitable type of airbag inflation device, such as a hybrid generator using a combination of compromised gas and solid fuel, a pyrotechnic airbag inflator which uses hot gases formed by powder, a heated gas inflator or a an inflation device using solid fuel. In an embodiment, the inflation device is a cold gas inflator.

The inflation device 60 is provided with a gas guide 65, for directing the gas into the airbag. The inflation device 60 is clamped, screwed, glued, sewed or the like onto the textile bag and the gas guide 65 is positioned inside the textile bag for directing the gas into the bag for inflating the airbag in a proper manner. The gas guide 65 may be T-shaped for being able to lead the gas into the airbag in a suitable stable way. Alternatively the gas guide 65 may be Y-shaped, I-shaped, arrow-shaped, multiple-part shaped cylindrical shaped or the like.

The inflation of the airbag 20 is controlled by the control unit 50. The control unit 50 controls the inflation of the airbag in case of an abnormal movement and prevents the airbag system from releasing at an undesired occasion. The control unit 50 may be implemented using instructions that enable hardware functionality, for example, by using executable computer program instructions in a general-purpose or special-purpose processor that may be stored on a computer readable storage medium (disk, memory etc.) 52 to be executed by such a processor. The control unit 50 may be configured to read instructions from the memory 52 and to execute these instructions to control the operation of the airbag system 100. The control unit 50 may be implemented using any suitable, publically available processor or Programmable Logic Circuit (PLC). The memory 52 may be implemented using any commonly known technology for computer-readable memories such as ROM, RAM, SRAM, DRAM, FLASH, DDR, SDRAM or some other memory technology.

The control unit 50 may be a dedicated control unit 50 or the control unit 50 may also be configured to control other functions.

The at least one sensor 80 collects data relating to the movement of the collar 10. The sensor 80 may be an accelerometer, a gyro, an air ultrasonic transducer, radar and/or a laser. In one embodiment at least one sensor is an accelerometer measuring acceleration in three dimensions and/or the sensor is a gyro detecting angular speed in three dimensions. Additionally, or alternatively, the at least one sensor 80 may be an ultrasonic transducer, or any device using electromagnetic waves, that measures the distance from the ground to the collar 10.

EP2313814, filed by the same applicant, discloses a method for detecting a bicycle accident without falsely classifying any data samples from normal cycling activities as accident. The system classifies the detected movement into either a "normal class" relating to movement patterns representing riding a bicycle or doing related activities or into an "action class" relating to movement patterns representing a bicycle accident.

The movement data gathered from the at least one sensor 80 is transmitted to the control unit 50. The control unit 50 processes the data and analyses it in order to evaluate if the processed data corresponds to an accident situation. If the data corresponds to pre-stored data indicating an accident situation, the control unit 50 transmits a triggering signal to the inflation device 60 to trigger the inflation of the airbag 20. The airbag 20 will consequently be inflated when the inflation device 60 receives the triggering signal.

The controller is coupled to the memory 52, which saves the measured and processed data. The saved data can be used to review and analyse the activity history of the airbag system. This is particularly useful if the airbag system has been deflated and technicians want to verify that the airbag system was working properly.

The airbag system 100 further comprises a communication interface 90, which is adapted to allow the airbag system 100 to communicate with other devices through the use of different communication technologies. Such communication technologies may be wired or wireless. Examples of such wired technologies are Universal Serial Bus (USB) and Ethernet to name a few. Examples of such wireless technologies are IEEE 802.11, IEEE 802.15, ZigBee, WirelessHART, WIFI, Bluetooth®, W-CDMA/HSPA, GSM, UTRAN and LTE to name a few. It should be noted that other technologies exist and are taken to be an obvious equivalent for such wireless communication interfaces.

Preferably, the communication interface 90 uses short-range wireless communication such as any of Bluetooth®, WLAN/WiFi, NFC (Near Field Communication), RF-ID (Radio Frequency Identification) or IrDA (Infrared Data Association).

If the communication interface 90 uses Bluetooth, the communication interface 90 has the benefit that it also can measure the distance between the airbag system 100 and other devices. This distance can for example be used to determine if the airbag system is to be put in an active or idle state.

The airbag system 100 may further comprise a user interface 95. The user interface 95 produces a signal detectable by the user, so as to alert the user 3 with different information. The user interface 95 may be used to alert the user 3 that his/hers external device 200 is nearby in order to remind the user to put the airbag system 100 in an active state and/or to alert that his/her external device 200 is far away and thus remind the user to turn off the airbag system 100. The user interface 95 may also be configured to indicate the status of the airbag system 100, i.e. the battery level, if the battery is in need for charging, if the inner elements of the helmet is intact or not, and if the system 100 is turned on. The user interface 95 may also indicate if the system 100 is turned on in an idle state or an active state.

The alert signal could be in the form of an audible signal such as siren, a haptic signal such as a vibration, a visual signal such as a strobe light or other sensory alarm that could be arranged on a user in the form of an airbag system 100.

The user interface 95 may comprise one or a plurality of light emitting diodes (LED), which indicate information using light signal(s). Different colors of the light or flashing signals may for example indicate different information. The user interface 95 may also comprise a speaker 112 sending out a sound signal, such as a buzz, or a device sending out a vibrating signal or a spoken phrase.

In an embodiment where the user interface 95 comprises a speaker 112, the speaker 112 may be used to send sound signals from an external device 200, transmitted using the communication interface 90. This external device 200 may be a different external device 200 than the one previously mentioned. These sound signals may e.g. comprise navigational signals directing the user where to turn, possibly using a global positioning system (GPS) 260 of an external device 200 (see FIG. 6).

The airbag system 100 has to be turned on, i.e. having power, in order to work properly. In one embodiment the airbag system 100 is turned on using an on/off-button arranged somewhere on the collar 10. In yet one embodiment, the airbag system 100 is turned on automatically once the collar 10 is placed around the neck 2 of the user 3.

In some embodiments, the airbag system 100 may either be turned on in an activate state or in an idle state. In the active state all parts of the airbag system 100 are active and the airbag is thus allowed to be inflated by a triggering signal. In the idle state the airbag systems 100 is powered up but other functions may be idle. In idle mode, the control unit 50 may be active whereas the inflation device 60 and the sensor(s) 80 is inactivated (i.e. no triggering signal is detected and the airbag is not inflated).

In one embodiment, the idle state and the active state is turned on/off by the interlocking means arranged on the collar 10. The interlocking means comprises a first fastening body and a second fastening body. One end of the first and second fastening body are each connected to the collar 10. The collar 10 is thus easily attached to the neck of the user by attaching the first fastening body and the second fastening body to each other, and the collar 10 is released from the neck of the user 3 by detaching the first and second fastening bodies from each other. In a preferred embodiment, the first and second fastening body are a female and male connector.

The interlocking means is configured to be arranged in a first locking position or a second locking position when the first fastening body and the second fastening body are connected to each other. When the interlocking means is in a first locking position, the system 100 is put into an idle state and when the interlocking means is in a second locking position, the system 100 is put into an active state.

External Device

As already mentioned, the protective airbag system 100 further comprises an external device 200, which will now be briefly described with reference to FIG. 4.

In the embodiment shown in FIG. 4 and in the following description, the external device is shown in the form of a bicycle 200. However, the external device mentioned herein is not limited to these examples but may take any possible form as long the device 200 comprises means for communicating within the airbag system 100. If the indented use for the airbag system 100 is riding a bicycle, the external device 200 may for example be a bicycle lock or any other device suitable for attachment on or in conjunction of a bicycle. If the intended use of the airbag system 100 is horse riding, the external device 200 may be a device suitable to be arranged on the horse, for example a saddle or a bridle.

The bicycle may be of any type of bicycle having at least one wheel such as a bicycle with one wheel, i.e. a unicycle, an ordinary bicycle having two wheels, a tricycle having three wheels or a quadracycle having four wheels. The bicycle may for example be a utility bicycle, mountain bicycles racing bicycle, hybrid bicycle, BMX bike, a tandem or an electric bicycle.

In the embodiment shown in FIG. 5, the bicycle 200 comprises two wheels, a frame, two pedals, a saddle and a front set having a handlebar grip. However, the external device 200 is not limited to any particular kind when it comes to physical design.

The external device 200 may also be a separate device which is configured to be attached to the bicycle.

The external device 200 further comprises means for communication. The external device 200 may comprise a communication interface 290 that communicates with the communication interface 90 arranged in the collar 10. Preferably, the communication interface 290 uses short-range wireless data communication, such as short-range wireless data communication such as, for instance, Bluetooth®, WLAN/WiFi, NFC (Near Field Communication), RF-ID (Radio Frequency Identification) or IrDA (Infrared Data Association).

If the communication interface 290 uses Bluetooth, the communication interface 290 has the benefit that it also can measure the distance between external device 200 and other devices such as the airbag system 100. This distance can for example be used to determine if a communication is successfully achieved.

In some embodiments, the external device 200 further comprises a controller 250. The controller 250 may be responsible for general device operations of the external device 200, for example controlling the speed and/or the ON-OFF function of the external device. This is particularly true in the embodiments where the external device 200 is an electrically powered bicycle.

The controller 250 may be implemented using any suitable, publically available processor or Programmable Logic Circuit (PLC). The controller 250 may be in operative connection with a memory (not shown). The memory may be implemented using any commonly known technology for computer-readable memories such as ROM, RAM, SRAM, DRAM, FLASH, DDR, SDRAM or some other memory technology.

In some embodiments, the external device 200 comprises a user interface 295. The user interface 295 produces a signal detectable by the user, so as to alert the user 3 with different information. The user interface 295 may be used to alert the user 3 that his/her airbag system 100 is turned off or in an idle ON-state and thus remind the user 3 to turn on the airbag system 100. The user interface 295 may also be configured to indicate the status of the external device 200 such as the battery level.

Preferably, the user interface 295 may comprise one or a plurality of light emitting diodes (LED), which indicate information using light signal(s). Different colors of the light may for example indicate different information.

The alert signal could also be in the form of an audible signal such as siren or a buzz or other sensory alarm that could be arranged on the external device 200.

If the bicycle is an electric bicycle it may also comprises an integrated electric motor (not shown) which can be used for propulsion and a controller for controlling the applied speed. There are many possible types of electric motorized bicycles with several technologies available and these will thus not be described further.

Figure 6:
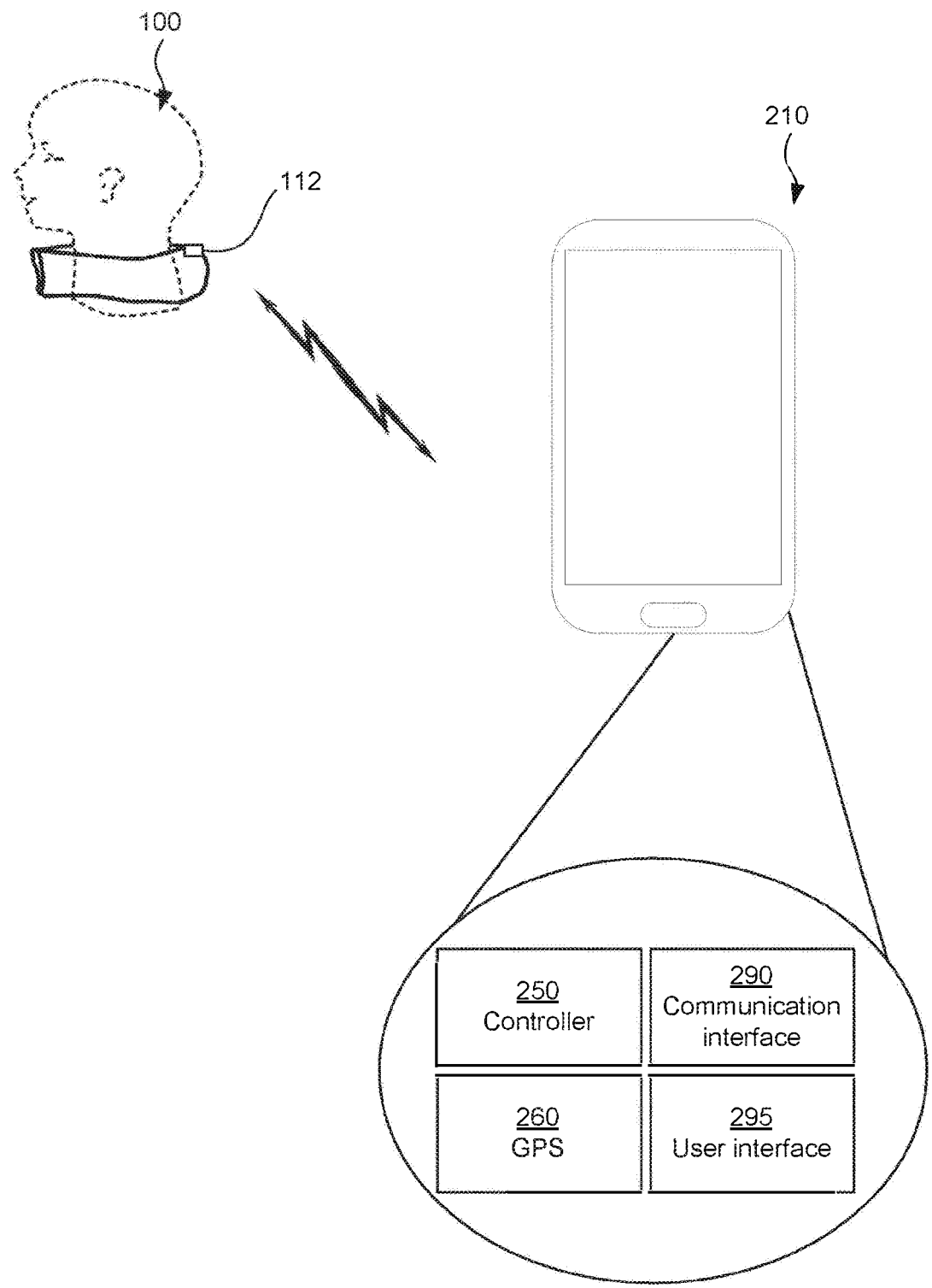
FIG. 6 is a schematic view of an airbag system and an external device according to an embodiment.

In another embodiment, as is schematically illustrated in FIG. 6, the external device 200 is a mobile phone 210. The user interface 95 of the airbag system 100 comprises a speaker 112, configured to transmit sound signals generated by the mobile phone 210, and transmitted using the communication interface 90. These sound signals may e.g. be streamed audio data, comprising real-time navigational signals directing the user where to turn, possibly using a global positioning system (GPS) 260 of the mobile phone 210.

Protective System

The provision of a protective system comprising an airbag system 100 and a external device 200 which differentiates between when the airbag system 100 and the external device 200 are within a predetermined distance or not solves or at least reduces the problem of having a person riding a bicycle without turning on the airbag system 100 and/or having a person walking around with the airbag system 100 in a powered state. This is done by the fact that the airbag system 100 and the external device 200 in the protective system interacts wirelessly with each other. If the airbag system 100 succeeds in establishing a short-range wireless data communication with the external device 200, one can assume that the user 3 of the airbag system 100 is in the vicinity of the external device 200. The communication may be used to change the mode of the airbag system 100 and/or the mode of the external device 200 depending on the communication status.

In the embodiment where the external device 200 is a bicycle or a bicycle lock the communication has several benefits, as will now be described.

The airbag system 100 is intended to be worn when riding a bicycle and is configured to determine if an accident, such as a fall or collision, has occurred when riding the bicycle. In order to reduce the power consumption and the possible risk of the airbag system 100 inflating unintentionally, the airbag system 100 should only be turned on, or turned on in an active state, when the user 3 is riding the bicycle or is in proximity of the bicycle (intending to ride the bike, or if he/she just got off the bike). If the airbag system 100 is turned on, or turned on in an active state, when the user 3 is moving away from his/hers bicycle 200, it would be preferable if the system 100 would be turned off or turned into an idle ON-state.

Furthermore, if the airbag system 100 is not turned on, or turned on in an idle state, while the user 3 is in proximity of his/hers bicycle 200 it would be beneficial if the bicycle 200 was put in a safety mode where the speed of the bicycle is reduced or where its not possible to bike at all (due to power cut off in the case of an electric bicycle or by a locking device).

In one embodiment, the communication interface 90 of the airbag system 100 is configured to attempt to communicate with the external device 200 using wireless communication. Additionally, or alternatively, the external device 200 is configured to attempt to communicate with the airbag system 100.

This attempt is conducted at predetermined time intervals, for example every 30 seconds, every minute or every second minute. The attempt may also be more seldom, such as every fifth minute.

In some embodiments the communication attempt is only conducted when it is detected that the user 3 of the airbag system 100 is walking and/or not riding a bicycle. In some embodiments the airbag system 100 is configured to determine what activity state the user is in, e.g. if the user is walking or riding a bicycle, based on movement data gathered from at least one sensor, the sensor either being the same as the sensor collecting movement data for triggering of the inflation or an additional sensor. The communication attempt may then be conducted only when the airbag system 100 is in a walking activity state, or when the user is not in a bicycling activity state.

In one embodiment the communication between the airbag system 100 and the external device 200 is considered to be successful if a communication is established between the airbag system 100 and the external device 200. In another embodiment the communication between the airbag system 100 and the external device 200 is successful if a communication is established between the airbag system 100 and the external device 200 and if the airbag system 100 and the external device 200 are within a predetermined distance from each other. The predetermined distance may be measured by the communication interface 90 of the airbag system and/or by the communication means 290 of the external device 200.

The communication between the airbag system 100 and the external device 200 will now be described further with exemplified embodiments with reference to FIGS. 5a-b.

Figure 5A:
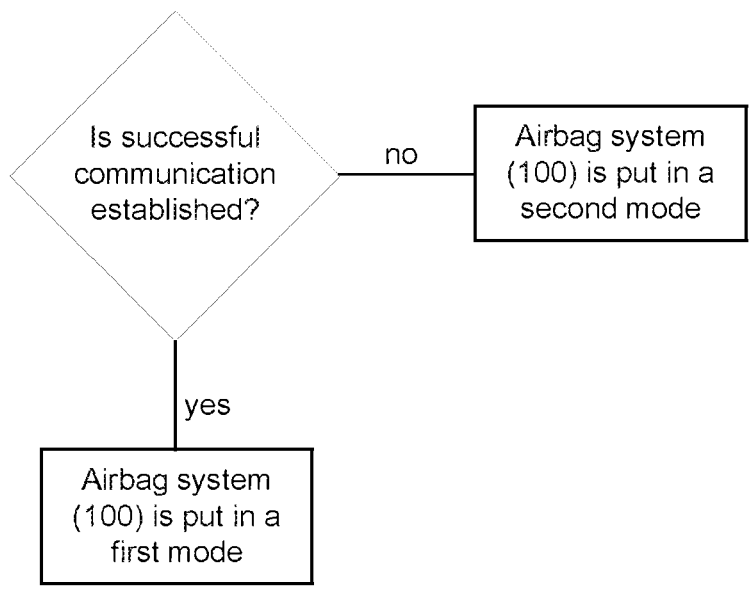
FIGS. 5a-c are schematic views of methods according to different embodiments.

As seen in the embodiment of FIG. 5a, if the communication between the airbag system 100 and the external device 200 is successful, the control unit 50 of the airbag system 100 is configured to put the airbag system 100 in a first mode. Depending on configuration the first mode may pertain to different functions.

In the first mode the control unit 50 may be configured to alert the user 3 that he/she should manually turn on, or turn on in an activate state, the airbag system 100 since he/she is in close proximity of the bicycle 200. If the airbag system 100 already is turned on, or turned on in an activate state, the control device 50 may be configured to not alert the user. The alert to the user 3 may be generated by the user interface 95 which produces a signal detectable by the user as described with reference to FIG. 3.

Additionally, or alternatively, the control unit 50 may be configured, in the first mode, to automatically put the airbag system 100 in an active state if the airbag system 100 has an idle ON-state and an active ON-state. In this way the airbag system 100 is always turned on and ready to protect the user 3 in case of a bicycle accident when the bicycle 200 is in proximity to the user 3.

If instead the communication between the airbag system 100 and the external device 200 is not successful, i.e. either the communication establishment fails or the communication is established but the airbag system 100 and the external device 200 is not within the predetermined distance from each other, the control unit 50 of the airbag system 100 is configured to put the airbag system 100 in a second mode. Depending on configuration the second mode may pertain to different functions.

In the second mode the control unit 50 may be configured to alert the user 3 that he/she should manually turn off, or turn the airbag system in an idle state, since he/she is not in close proximity of the bicycle 200. If the airbag system 100 already is turned on in an idle state, the control device 50 may be configured to not alert the user 3.

Additionally, or alternatively, the control unit 50 may be configured, in the second mode, to automatically turn off the airbag system 100 or put the airbag system 100 in an idle state if the airbag system 100 has an idle ON-state and active ON-state. In this way the airbag system 100 is turned off, or turned into an idle ON-state, once the user 3 is not in proximity of the bicycle 200. This reduces battery consumption of the airbag system 100 and eliminates the possible risk of the airbag 20 being inflated unintentional.

Figure 5B:
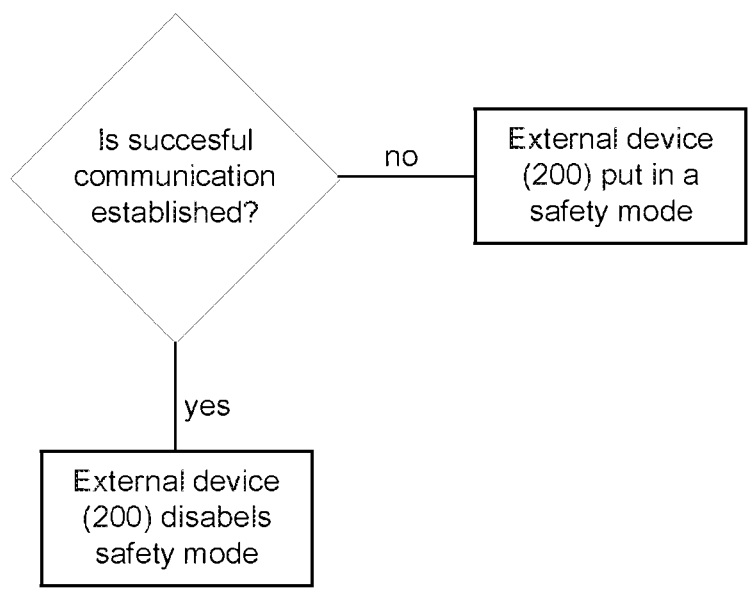

In the embodiment shown in FIG. 5b, the state of the external device 200 is changed depending on the communication between the airbag system 100 and the external device 200. As seen in the embodiment of FIG. 5b, if the communication between the airbag system 100 and the external device 200 is successful the controller of the external device 200 is configured to disable the external device 200 from a safety mode, if activated.

If instead the communication between the airbag system 100 and the external device 200 is not successful, i.e. fails, the controller of the external device 200 is configured to put the external device 200 in a safety mode of the external device 200.

Depending on configuration the safety mode may pertain to different functions. In the safety mode the controller 250 of the external device may be configured to alert the user 3 to put on the airbag system 100 in an idle mode. This may for example be done by a light indicator visibly arranged on the external device 200.

Additionally, or alternatively, the controller 250 of the external device 200 may be configured, in the safety mode, to prevent the user 3 from using the external device 200. This may for example be prevented by locking the bicycle by a locking device (not shown) which is locked in a safety mode and unlocked when the safety mode is disabled. Such a locking device may be a smart lock which is able to communicate with the external device 200, so as to open the lock when the safety mode is disabled.

In the embodiment where the external device 200 is a bicycle lock, the locking device is able to communicate with the airbag system 100 so that the safety mode of the external device 200 pertains to locking the bicycle lock. Disabling the safety mode thus means opening the bicycle lock.

In the embodiment where the external device 200 is an electric bicycle, the user could also be prevented from using the bicycle 200 by having a safety mode configured to lock the electric bicycle 200 so as to prevent the user 3 from using it by power cut-off. Alternatively, the safety mode is configured to reduce the maximum allowed speed of the electrical bicycle 200. In this way, if the user 3 is not wearing the airbag system 100, or the system is not turned on in an active state, the bicycle cannot be used or can only be used at a slow speed.

Figure 5C:
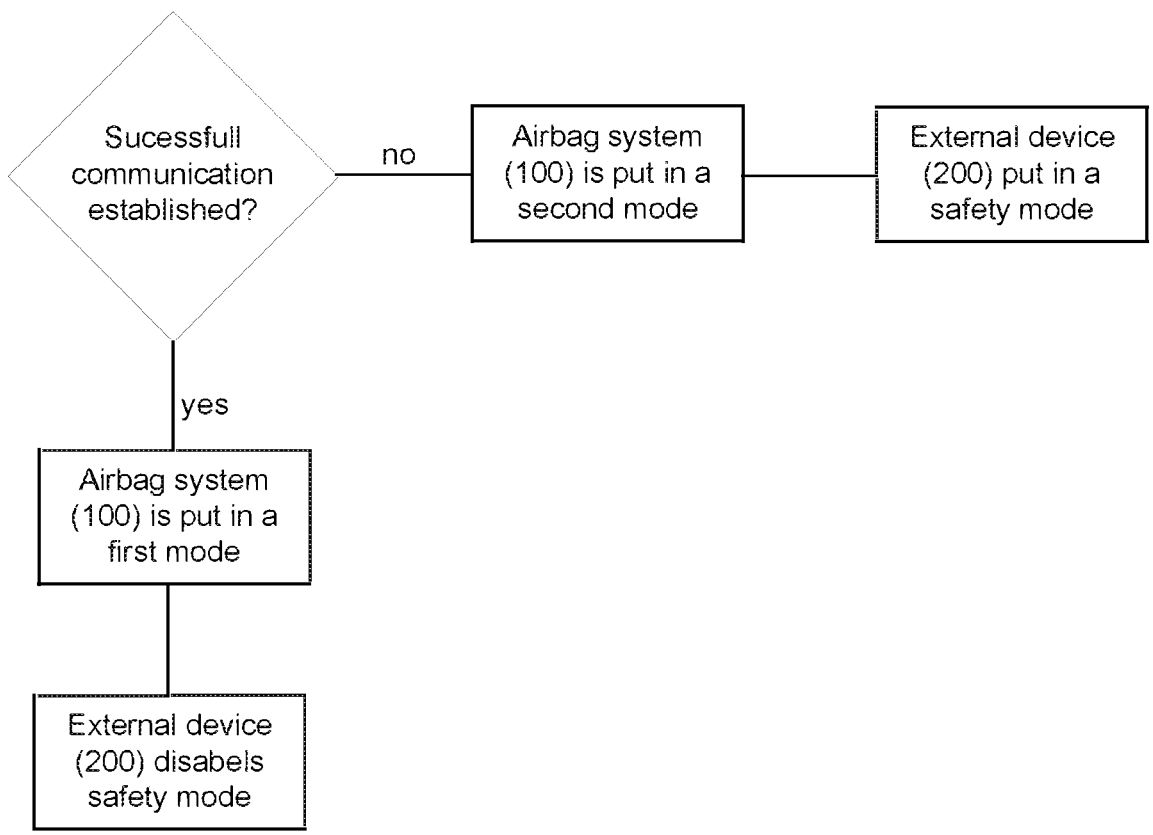

The two embodiments disclosed in FIG. 5*a*-*b* can be combined. One such combination is seen in FIG. 5*c*, showing that if the communication is successful the airbag system 100 is put in a first mode and the external device 200 disables the safety mode, if present. If the communication fails, the airbag system 100 is put in a second mode and the external device 200 is put in a safety mode.

It should be understood that different combinations of the different configurations could be made and that the configurations could be made simultaneously with each other or in a prescribed order, e.g. first put the external device 200 in a safety mode and then put the airbag system 100 in a second mode.

The invention claimed is:

1. A protective system, comprising:
an airbag system in a form of an inflatable helmet for protecting a body part of a user in case of an accident when the user performs a specific activity, comprising a control unit and a communication interface; and
an external device associated with the specific activity comprising a communication interface,
wherein the communication interface of the airbag system is configured to attempt to communicate with said external device using wireless communication,
wherein when the communication between the airbag system and the external device is successful, the control unit of the airbag system is configured to put the airbag system in an active state and/or to alert the user to manually change to the active state,
wherein when the communication between the airbag system and the external device is not successful, the control unit of the airbag system is configured to put the airbag system in an idle state and/or to alert the user to manually change to the idle state, and
wherein when the airbag system is in the active state, the airbag system is configured to detect an accident, and
wherein when the communication between the airbag system and the external device is not successful, a controller of the external device is configured to control the external device into a safety mode, or
wherein when the communication between the airbag system and the external device is successful, the controller of the external device is configured to disable the safety mode of the external device.

2. The protective system according to claim 1, wherein the wireless communication is short-range wireless communication.

3. The protective system according to claim 2, wherein the short-range wireless communication may pertain to any of Bluetooth, WLAN, WiFi, NFC, RF-ID or IrDA.

4. The protective system according to claim 1, wherein the communication between the airbag system and the external device is successful when a communication is established between the airbag system and the external device.

5. The protective system according to claim 1, wherein the communication between the airbag system and the external device is successful when a communication is established between the airbag system and the external device, and the external device and the airbag system are within a predetermined distance from each other.

6. The protective system according to claim 1, wherein the communication between the airbag system and the external device is unsuccessful when communication fails to establish between the airbag system and the external device.

7. The protective system according to claim 4, wherein the communication between the airbag system and the external device is unsuccessful when a communication is established between the airbag system and the external device, but the external device and the airbag system are not within a predetermined distance from each other.

8. The protective system according to claim 1, wherein in the safety mode the controller of the external device is configured to lock the external device so as to prevent the user from using the external device.

9. The protective system according to claim 1, wherein the external device is an electric bicycle and wherein in the safety mode the controller of the electric bicycle is configured to lock the electric bicycle so as to prevent the user from using the electric bicycle or to reduce an allowed speed of the electrical bicycle.

10. The protective system according to claim 1, wherein the external device is a bicycle.

11. The protective system according to claim 1, wherein the external device is a bicycle lock.

12. The protective system according to claim 1, wherein the external device is a mobile phone.

13. The protective system according to claim 12, wherein the airbag system comprises a speaker, and wherein the mobile phone is configured to stream audio data to said speaker.

14. The protective system according to claim 13, wherein the audio data is real-time navigation audio.

\* \* \* \* \*